United States Patent [19]
Whitaker

[11] 4,073,462
[45] Feb. 14, 1978

[54] SUPPORT DEVICE

[76] Inventor: Edward Whitaker, Box 11284, Cincinnati, Ohio 45211

[21] Appl. No.: 589,868

[22] Filed: June 24, 1975

[51] Int. Cl.² ............... A01K 97/10; A01K 97/12; F16B 47/00
[52] U.S. Cl. ............... 248/537; 248/206 R; 248/302; 248/513; 248/520; 248/538; 248/539
[58] Field of Search .......... 248/44, 46, 48, 38, 248/39, 302, 176, 220, 206 R; 211/64, 119

[56] References Cited

U.S. PATENT DOCUMENTS

| 525,132 | 8/1894 | Burke | 248/38 |
|---|---|---|---|
| 1,488,962 | 4/1924 | Ward | 211/54 UX |
| 1,682,855 | 9/1928 | Rose | 248/302 X |
| 2,455,278 | 11/1948 | Stewart et al. | 248/176 UX |
| 2,602,617 | 7/1952 | Muth | 248/44 X |
| 2,899,156 | 8/1959 | Marcucci | 248/48 |

FOREIGN PATENT DOCUMENTS

| 370,604 | 7/1920 | Germany | 248/206 R |
|---|---|---|---|
| 409,449 | 5/1934 | United Kingdom | 248/38 |

Primary Examiner—J. Franklin Foss
Attorney, Agent, or Firm—J. Warren Kinney, Jr.

[57] ABSTRACT

An elongate rod is formed with an "S" shaped terminal portion at one end for providing an inner, or first, downwardly-open loop-adapted to be engaged by a member to be supported, and an outer, or second, upwardly-open loop adapted to restrain a member bearing thereagainst. The other end of the rod terminates in means for either securely, though releasably, anchoring the rod to a portable support base which is adapted to be affixed to a support surface, or means for securely, though releasably, anchoring the rod to a support surface, per se.

19 Claims, 12 Drawing Figures

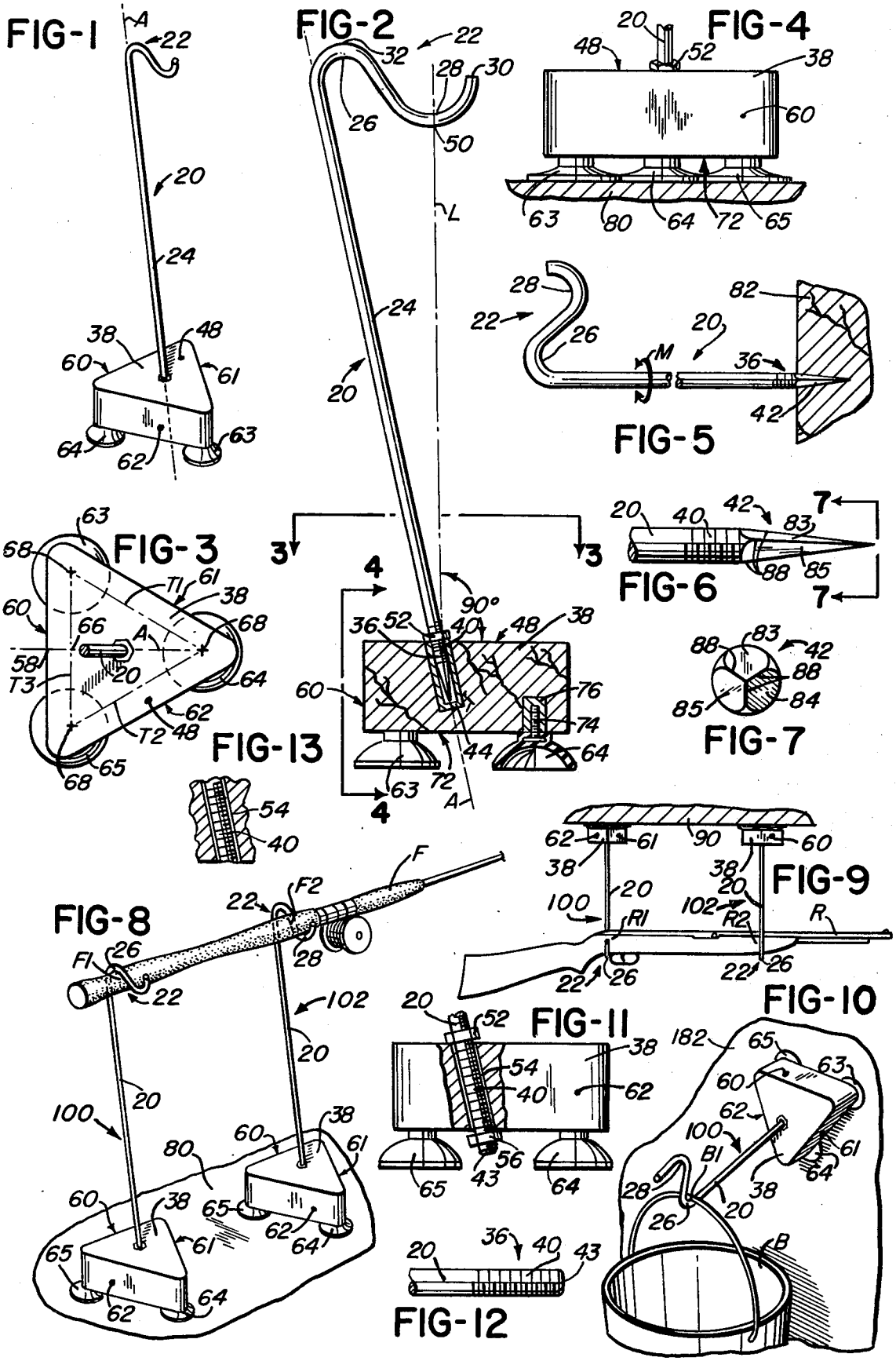

SUPPORT DEVICE

BACKGROUND OF THE INVENTION

1. Field of the Invention

The present invention is directed to a support device which is formed from an elongated rod, opposite ends which terminate in a support defining member and an anchoring member, respectively.

2. Description of the Prior Art

Applicant is aware of the following U.S. Patents, each of which discloses a fishing pole holder which comprises, in general, an elongate rod including an outer end which is formed whereby to provide a pair of substantially concentric, spaced loops adapted to receive and engage longitudinally spaced portions of a fishing pole for securing same in a substantially horizontal position: Nielson, U.S. Pat. No. 3,699,390; Fliege, U.S. Pat. No. 3,593,949; Wheeler, U.S. Pat. No. 3,306,560; Brooks, U.S. Pat. No. 2,561,046; and Huntly, U.S. Pat. No. 2,139,826.

Applicant is also aware of the following U.S. Patents, each of which discloses a fishing pole holder which comprises, in general, a plurality of elongate members collectively defining a pair of substantially concentric, spaced loops adapted to receive and engage longitudinally spaced portions of a fishing pole, said members being secured to and carried by a single anchoring member which is disposed substantially normal to the axis of the fishing pole: Parker, U.S. Pat. No. 2,751,174 and McHuron, U.S. Pat. No. 2,176,352.

Further, applicant is aware of the Benner, U.S. Pat. No. 3,198,408 and Goldfus, U.S. Pat. No. 2,980,379, Patents, each of which discloses a support member of the type which is carried by a base having suction cups or the like for mounting the base to a support surface.

The various support members disclosed in these Patents are readily distinguishable from the support device of the present invention.

SUMMARY OF THE INVENTION

The present invention comprises a support device defined by an elongate rod having one end which is bent to provide an "S" shaped terminal portion which projects radially outward from the axis of the rod, wherein the other end terminates in means for securely, though releasably, anchoring the device to a support member. The "S" shaped terminal portion comprises an inner, or first, downwardly-open loop adapted to be engaged by a member to be supported, and an outer, or second, upwardly-open loop adapted to restrain a member bearing there against.

In one form of the invention, the support member comprises a portable base having a rod-receptive sleeve or socket and means such as, by way of example, a plurality of suction cups or the like for securely, though releasably affixing the base to a support surface. Preferably, the suction cups are arranged in a triangular configuration, wherein the rod is anchored in the base such that the geometric center of the triangle is in alignment with the second, or upwardly-open loop, whereby the force generated by a member bearing against the second loop is distributed equally among the suction cups. The first, or downwardly-open loop is disposed intermediate the geometric center and one leg of the triangle, whereby the force generated by a member which is supported by the first loop "pulls" upwardly against the two suction cups at opposite ends of the leg of the triangle.

The anchor-defining end of the rod also includes a three-facet, elongate point which is adapted to be suitably driven directly into the support member for securely, though releasably, anchoring the device. By twisting or turning the rod about its axis, the edges of the three-facet point act as cutting blades and enlarge the cavity formed by the point, whereby the device is released from the support surface.

The subject device is equally suited for supporting articles relative to vertical, horizontal, and overhead support surfaces. The device is particularly well adapted, when used in pairs, to securely, though releasably, support elongated objects such as, by way of example, fishing poles, guns, and the like, relative to the support surface.

It is, therefore, an object of the present invention to provide a support device for securely, though releasably, supporting articles relative to a support surface.

Other objects and features of the invention will be readily apparent from the accompanying drawings and from the detailed description which follows.

BRIEF DESCRIPTION OF THE DRAWINGS

FIG. 1 is a perspective view of a support device embodying the teachings of the present invention.

FIG. 2 is a side view of the support device of FIG. 1, with the base member shown in section for clarity of detail and understanding.

FIG. 3 is a view taken at line 3—3 of FIG. 2.

FIG. 4 is a view taken at line 4—4 of FIG. 2, and illustrates the support device anchored to a base member which is, in turn, mounted on a support surface.

FIG. 5 is a side view, partly in section, illustrating the support device anchored directly into a support member.

FIG. 6 is an enlarged fragmentary view of a terminal end of the device of FIG. 5.

FIG. 7 is a view taken at line 7—7 of FIG. 6.

FIG. 8 is a perspective view illustrating a manner in which a pair of the support devices shown in FIG. 1 may be utilized for securely, though releasably, supporting an elongated member such as, by way of example, a fishing rod relative to a substantially horizontal support surface.

FIG. 9 is a side view illustrating a manner in which a pair of the support devices shown in FIG. 1 may be utilized for securely, though releasably, suspending an elongated member such as, by way of example, a gun from an overhead, substantially horizontal support surface.

FIG. 10 is a perspective view illustrating a manner in which the device shown in FIG. 1 may be utilized for securely, though releasably, suspending article such as, by way of example, a pail from a substantially vertical support surface.

FIG. 11 is a fragmentary view, partly in section, and illustrates an alternate manner of anchoring the lower end of the elongate support rod relative to a base member.

FIG. 12 is a fragmentary view of the lower terminal end of the rod of FIG. 11.

FIG. 13 is a fragmentary view, partly in section, and illustrates an alternate manner of anchoring the lower end of the elongate support rod relative to a base member.

DESCRIPTION OF THE PREFERRED EMBODIMENTS

In the drawings, the numeral 20 denotes an elongate rod, one end of which is bent to form an "S" shaped terminal portion 22 which projects radially or laterally, outward from the axis "A" of the rod as defined by the straight, intermediate portion 24.

The "S" shaped terminal portion comprises an inner, or first, downwardly-open loop 26 and an outer, or second, upwardly-open loop 28 (FIG. 2), wherein the downwardly-open loop is adjacent straight portion 24 of the rod, and wherein the upwardly-open loop is remote therefrom. In the preferred embodiment of the invention, the free outer end 30 of the "S" shaped terminal portion 22 is in substantial horizontal alignment with apex 32 of the downwardly-open loop 26 when rod 20 is mounted in a support base 38 or the like.

The opposite, lower terminal end 36 of rod 20 is provided with means such as, by way of example, external threads 40 for anchoring the rod to support base 38 (FIGS. 4, 6, 11 and 12), and/or means such as, by way of example, the three-facet, triangular, elongate point 42 for anchoring the rod directly to a support surface 82 or the like (FIGS. 5-7).

Socket 44 is provided in base 38 for receiving the lower terminal end 36 of the rod and includes internal threads for engaging threads 40. Preferably, the socket is disposed at an inclined angle, whereby line "L", which intercepts the axis "A" of rod 20 at upper surface 48 of support base 38 and projects normally outward from the support base, intersects apex 50 of the second, downwardly-open loop 28. Lock nut 52 securely, though releasably, locks the support base and socket relative to the lower terminal end 36 of the rod.

It should, of course, be understood that elongate rod 20 may be anchored to support base 38 by utilizing a through aperture 54 instead of the closed-ended socket 44 (FIG. 11). Where desired, as shown in FIG. 13, aperture 54 may include an internally threaded sleeve for engaging threads 40, or may be apated to loosely accomodate rod 20, wherein a pair of opposing lock nuts 52, 56 are utilized for securely, though releasably, locking rod 20 relative to base 38.

Terminal end 36 need not include the three-facet point 42 when the rod is to be anchored in support base 38, or the like, but may terminate in the blunt, externally threaded end 43 (FIGS. 11 and 12).

In the preferred form, a plurality of suction cups 63, 64 and 65 are mounted to project outwardly from the under surface 72 of base member 38, whereby the support base may be securely, though releasably, affixed to a support surface 80, or the like as in FIG. 4. A plurality of threaded sockets 76 may be mounted in base member 38 for receiving externally threaded posts 74 of the corresponding suction cups 63-65 (FIG. 2).

Preferably, the suction cups are arranged in triangular configuration, wherein centers 68 of the cups define an equilateral triangle as indicated by the broken lines T1, T2 and T3 (FIG. 3). The geometric center of the triangle is located at the point where rod 20 intersects the upper surface 48 of base 38.

Base 38 may be triangular in shape, having parallel upper and lower surfaces 48 and 72 and side walls 60, 61 and 62 which are disposed substantially parallel with broken lines T2, T3 and T1, respectively, as shown in FIG. 3. In the preferred form, the base is formed from buoyant material having a specific gravity of less than one such as, by way of example, wood or the like, whereby the entire support device including rod 20, base 38 and suction cups 63-65 will float at or near the surface of water.

Rod 20 projects outwardly from the upper surface 48 of the support base with axis "A" inclined toward side wall 60 and intersecting the plane of the side wall at a point in vertical alignment with midpoint 58, thereby bisecting line T3 of the triangle as shown at 66.

Loops 26 and 28 of the "S" shaped terminal portion of the rod are in alignment with midpoints 58 and 66. The upwardly-open loop 28 is disposed in vertical alignment with the geometric center of the triangle, as indicated by line "L" (FIG. 2), whereas the downwardly-open loop 26 is intermediate the geometric center and line T3 which connects centers 68 of suction cups 63,65. Thus, a member which is bearing against upwardly-open loop 28 of the rod will generate a downward force which is distributed equally among cups 63, 64 and 65, whereas a member supported by and bearing upwardly against downwardly-open loop 26 of the rod will "pull" upwardly with equal force against cups 63,65 and will exert a lesser force on cup 64.

As shown in FIG. 5, rod 20 may be directly anchored to a support member 82 such as, by way of example, a log, railroad tie, pier surface, piling end or the like, by utilizing the three-facet point 42 at end 36 (FIGS. 6 and 7). It will be understood that support member 82 is generally substantially horizontal and that FIG. 5 is rotated 90°, as shown.

The sharp tip defined by the elongate taper of the three faces 83, 84 and 85 of the point permits terminal end 36 of the rod to be suitably driven into member 82, wherein the point displaces the material in the support member and creates a form fitting cavity securely anchoring the rod in the support member. The triangular shape of each face provides an ever increasing bearing surface between the walls of the cavity and faces 83, 84 and 85, whereby the rod is securely anchored for supporting an article bearing against loop 28.

Preferably, one face 83 of point 42 is in alignment with the "S" shaped terminal portion 22 of rod 20 and provides maximum bearing area between the cavity and the point for effectively distributing the force which is generated by a supported article in the event it is urged toward or away from the axis of the rod. That is, the "S" shaped terminal portion of the rod and a line passing through the axis of the rod and normal to face 83 of the point lie in a common plane.

The support device is released from wall 82 by rotating rod 20 about its axis, as indicated by arrow "M". The edges 88 between adjacent faces 83, 84 and 85 of the three-facet point 42 act as cutting blades and enlarge the cavity whereby the rod may be readily withdrawn.

FIGS. 8, 9 and 10 illustrate the manner in which the support device including rod 20 and base 38 may be used for supporting a plurality of articles relative to a substantially horizontal surface 80 (FIG. 8), an overhead, horizontal surface 90 (FIG. 9) and a vertical surface 182 (FIG. 10). As shown in FIGS. 9 and 10, a pair of support devices may be used for supporting an elongated article such as, by way of example, fishing pole "F" or gun "R".

When an article such as fishing pole "F" is to be supported adjacent one end thereof, with the other end projecting outwardly from the support devices, the rod will be supported at F1 by downwardly-open loop 26 of device 100 and will bear against upwardly-open loop 28 of device 102 at F2. When the article is supported in this manner, it is desireable that bases 28 of devices 100 and 102 be similarly disposed, wherein rods 20 are disposed in substantial parallelism.

When an elongate article is supported adjacent its opposite ends, the same loop of each device 100,102 is utilized. As shown in FIG. 9, gun "R" is suspended from overhead surface 90 at R1 and R2, wherein the article is supported by loop 26 of each device 100,102. When the article is supported in this manner, it is desireable that the base of device 100 be rotated 180° relative to the base of device 102, wherein the intermediate straight portions of rods 20 are at either side of gun "R" and provide additional support ensuring against accidental removal of the gun from the supports.

A hanging article such as pail "B" may be suspended from vertical wall 182, as shown in FIG. 10. When pail "B" is supported in this manner, it is desireable that rod 20 be rotated 180° relative to base 38, wherein the handle of the pail engages loop 26 at B1 and generates a "pulling" force outwardly from the wall at the two cups 63 and 65 of the base and a "pushing" force inwardly toward the wall at the single cup 64.

It should, of course, be understood that the support device of the present invention may be utilized to support any variety of articles from a vertical, horizontal or overhead surface, or any combination thereof, without departing from the scope and spirit of the invention.

What is claimed is:

1. A support device comprising:
   a base which includes a plurality of attaching means for releasably connecting said base to a supporting surface, said attaching means each being connected to said base to form a triangle having a geometric center;
   a support rod having an elongate body and being connected at one end thereof to said base adjacent said geometric center and extending outwardly from said base, said rod body being bent at the other end thereof into an S-shape which includes a first loop adjacent said rod body and having an open portion presented toward said base and a second loop remote from said rod body having an open portion presented away from said base;
   said rod being inclined with respect to said base so that said second loop is located in vertical alignment with said geometric center and said first loop is located between said geometric center and a line connecting two of said attaching means so that force generated by a member bearing against said first loop is essentially evenly distributed via said base among said plurality of attaching means and force generated by a member bearing against said second loop is essentially evenly distributed via said base between said two attaching means.

2. A device as called for in claim 1, wherein the said first loop includes an apex and said S-shaped portion includes a free, outer end which is disposed in substantial alignment with the apex of said first loop.

3. A device as called for in claim 1, wherein the base has means for receiving and anchoring the said other end of the rod body.

4. A device as called for in claim 3, wherein:
   said one end of the rod body is externally threaded; and wherein
   the means for receiving and anchoring said one end of the rod body comprises a socket which is internally threaded for engaging the external threads of said one end of the rod body.

5. A device as called for in claim 3, wherein:
   said other end of the rod is externally threaded; and wherein
   the means for receiving and anchoring said one end of the rod body comprises a through bore in said base dimensioned to receive the threaded end of the rod body, and internally threaded means engaging the external threads of the rod body for securely, though releasably, anchoring the rod to said base.

6. A device as called for in claim 5, wherein said internally threaded means comprises an open-ended sleeve mounted in and extending substantially the length of said bore, said sleeve being internally threaded for engaging the externally threaded end of the rod body.

7. A device as called for in claim 3, wherein:
   the base includes substantially parallel upper and lower surfaces;
   said one end of the rod is externally threaded; and
   said means for receiving and anchoring the one end of the rod body comprises an internally threaded socket adapted to receive the externally threaded end of said rod body, said socket having an upper end in open communication with the upper surface of said base.

8. A device as called for in claim 5, wherein:
   said base includes substantially parallel upper and lower surfaces;
   the external threads of the rod body extend beyond the upper and lower surfaces of said base, and said internally threaded means includes a pair of nuts disposed in abutting engagement with the upper and lower surfaces of the base for securely, though releasably, anchoring the rod thereto.

9. A device as called for in claim 1, wherein:
   the base includes substantially parallel upper and lower surfaces; and
   the means for securely, though releasably, attaching the base to a supporting surface comprises three suction cups projecting from the lower surface of the base.

10. A device as called for in claim 2, wherein the terminal portion is disposed in a plane which is essentially perpendicular to a plane containing said line connecting said two attaching means.

11. A device as called for in claim 1, wherein said base is an equilateral triangle with said attaching means each positioned thereon adjacent an apex thereof.

12. A device as called for in claim 1, wherein both loops of said "S" shaped end of the rod lie in a single plane.

13. A device as called for in claim 1, wherein the said one end of the rod body terminates in a three-facet point.

14. A device as called for in claim 13, wherein the "S" shaped end of the rod body is in the same plane as a line passing through the axis of the rod and normal to one facet of the three-facet pointed end.

15. A device as called for in claim 14, wherein said one facet of the pointed end and the "S" shaped end are at the same side of the rod body.

16. A device as called for in claim 3, wherein said base comprises a buoyant material having a specific gravity of less than one.

17. A support device comprising an elongate rod, one end of which is bent to form an "S" shaped terminal portion which projects laterally from the axis of the rod and which comprises a first, downwardly-open loop adjacent the rod, and a second, upwardly-open loop remote therefrom, wherein the free outer end of the "S" shaped terminal portion is disposed in substantial alignment with the apex of said first loop, the other end of said rod being straight, and externally threaded, a support member having substantially parallel upper and lower surfaces, an internally threaded socket in said member having an upper end in open communication with said upper surface and inclined relative thereto, whereby the upwardly-open loop of the "S" shaped terminal portion of the rod is disposed in substantial vertical alignment with the upper end of the socket when the threaded end of the rod is received in the socket, and means for securely, though releasably, attaching the member to a supporting surface, wherein said means comprises three suction cups which project in triangular relationship from the lower surface of said member.

18. A support device comprising:

a rod having an elongate body with one end thereof bent into an S-shape which includes a first loop which is located adjacent said rod body and has an open portion presented toward the other end of said rod and a second loop which is located remote from said rod body and has a terminal end and an open portion presented away from said rod other end, said first and second loops being located in a common plane; and a point positioned on the other end of said rod body to define a tip for insertion into a supporting structure for releasably mounting said rod on said supporting structure, said point including a plurality of facets with one facet having a facial surface which is oriented to be in a plane which is essentially perpendicular to said common plane so that force generated on said S-shaped end by a member bearing thereagainst is distributed essentially evenly over the facial surface of said one facet.

19. A device as called for in claim 18, wherein said point includes three facets.

* * * * *